Patented May 3, 1949

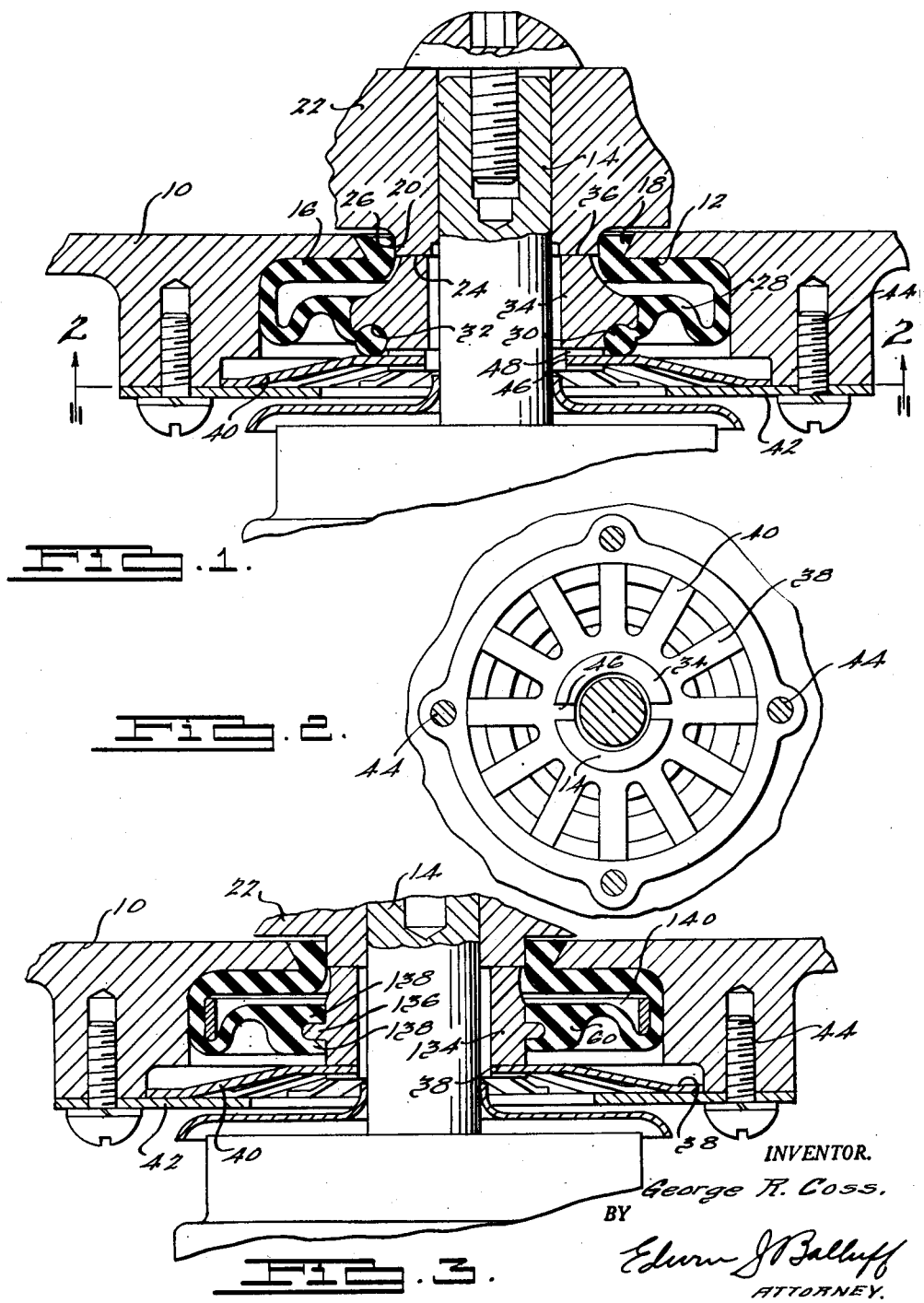

2,469,065

UNITED STATES PATENT OFFICE 2,469,065

SEAL

George R. Coss, Detroit, Mich., assignor to Eureka Williams Corporation, a corporation of Michigan Application October 22, 1945, Serial No. 623,721

4 Claims. (Cl. 286—11)

This invention relates to seals for providing a running joint between relatively rotating parts.

Principal objects of the invention are to provide:

A new and improved seal;

A seal which is particularly adapted for use in applications where abrasive materials are encountered;

A seal employing a graphite sealing ring in which means are provided to protect the sealing surface of the graphite sealing ring from abrasives and other material that might adversely affect the utility thereof.

Other and further objects of the invention will be apparent from the following description and claims and will be understood by reference to the accompanying drawings, of which there is one sheet, which, by way of illustration, show preferred embodiments and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims. I also contemplate that of the several different features of my invention, certain ones thereof may be advantageously employed in some applications separate and apart from the remainder of the features.

In the drawings

Fig. 1 is a vertical sectional view of a seal embodying the invention;

Fig. 2 is a view on a reduced scale taken along the line 2—2 of Fig. 1; and

Fig. 3 is a view similar to Fig. 1 but illustrating a modified form of the invention.

As illustrated in the embodiment of the invention shown in Fig. 1, a wall 10 is provided with an opening therethrough, such opening defining the seat 12. A shaft 14 projects through the opening. A bellows 16 is secured in the seat 12 and sealed thereto. The bellows 16 includes an axially projecting neck or cylindrical portion 18 which extends toward one face of the opening through the wall 10. The inner cylindrical surface 20 of the neck 18 comprises a cylindrical sealing surface. The bellows is made of a suitable resilient material, such as neoprene or some other rubber-like material.

A member 22 fixed to the shaft 14 for rotation therewith is provided with an annular sealing surface 24 and a cylindrical sealing surface 26, the surface 26 being engaged by the surface 20 of the neck 18 so as to provide a seal therebetween.

The bellows 16 is further provided with an inwardly extending circular portion 28 having a bead 30 seated in and sealed to an annular groove 32 formed in one end of sealing member 34. The sealing member 34 is annular and formed of graphite. It has an annular sealing surface 36 engageable with the annular surface 24 of the member 22 so as to provide a running seal therebetween. The sealing surfaces 24 and 36 are smoothly finished planar surfaces.

A spring 38 comprising a disc having a plurality of radially extending arms 40 is arranged so that the central part of the spring 38 bears against the bead 30 thereby urging the same into the groove 32 and thereby urging the sealing face 36 of the sealing member 34 into engagement with the annular sealing surface 24 of the sealing member 22.

The outer ends of the spring 38 are seated on a retainer 42 comprising a flat washer-like element which is secured to the wall by means of a series of screws 44. The spring 38 is provided with a plurality of inwardly extending tongues 46 which project into notches 48 in the sealing member 34 so as to prevent rotation thereof.

As illustrated the seal construction is for the purpose of preventing leakage of fluid from the container of which the wall 10 forms the bottom. It will be observed that a double seal is provided, one by the engagement of the surfaces 26 and 20, and the other by the engagement of the surfaces 24 and 36. The shaft 14 may comprise the shaft of an electric motor. The bellows 16 permits axial movement of the sealing member 34 in order to follow whatever limited axial movement of the member 22 might be present in the assembly.

In the embodiment illustrated in Fig. 3, the construction is quite similar except that the end 60 of the bellows does not project below the end of the sealing member 134. In this case the sealing member 134 is provided with an annular flange 136 which is received between and sealed to the bifurcations 138 provided on the end 60 of the bellows. In addition the spring 38 bears directly against the end of the sealing member 134 as compared with the arrangement in Fig. 1 where the spring bears against the bead 30. The construction and operation of the seal shown in Fig. 3 otherwise is essentially the same as that described in connection with Fig. 1.

While I prefer to make the ring 34 of graphite, it may be made of any other suitable material.

If desired a spring 140 may be employed to help retain the bellows seated and sealed in its seat in the opening in the wall 10.

While I have illustrated and described preferred embodiments of my invention, it is understood that these are capable of modification and I therefore do not wish to be limited to the precise details set forth but desire to avail myself of such changes and alterations as fall within the purview of the following claims.

I claim:

1. Seal construction for a wall having an opening defining a seat with a shaft extending through said opening, a bellows having one end thereof secured in and sealed to said seat, a sealing ring surrounding said shaft and carried by and sealed to the other end of said bellows, a sealing member secured to said shaft and having an annular sealing surface and a cylindrical sealing surface, said sealing ring having an annular sealing surface engaged with said annular sealing surface of said sealing member, and said bellows having a cylindrical sealing surface engaged with said cylindrical sealing surface of said sealing member, and means resiliently urging said annular sealing surfaces in engagement.

2. Seal construction according to claim 1 wherein said means comprises a spring bearing against said other end of said bellows.

3. Seal construction according to claim 1 wherein said means comprises a spring bearing against said ring.

4. Seal construction comprising a bellows of resilient material, a sealing ring connected and sealed to one end of said bellows and nested therein, a sealing member having an annular sealing surface and a cylindrical sealing surface, said sealing ring having an annular sealing surface engaged with said annular sealing surface of said sealing member and said bellows having a cylindrical sealing surface engaged with said cylindrical sealing surface of said sealing member, and means resiliently urging said annular sealing surfaces in engagement.

GEORGE R. COSS.

REFERENCES CITED

The following references are of record in the file of this patent:

UNITED STATES PATENTS

| Number | Name | Date |
|---|---|---|
| 1,840,127 | Penney | Jan. 5, 1932 |
| 1,851,032 | Bischof | Mar. 29, 1932 |
| 2,295,627 | Beier | Sept. 15, 1942 |